United States Patent [19]

Pierrat

[11] 4,314,591
[45] Feb. 9, 1982

[54] LOG SPLITTER WITH IMPROVED CLAMP

[76] Inventor: Michel A. Pierrat, 48 Farrwood Dr., Andover, Mass. 01810

[21] Appl. No.: 53,199

[22] Filed: Jun. 29, 1979

Related U.S. Application Data

[63] Continuation-in-part of Ser. No. 873,060, Jan. 27, 1978, abandoned.

[51] Int. Cl.³ .................................................. B27L 7/00
[52] U.S. Cl. ............................ 144/193 A; 248/354 L; 248/410
[58] Field of Search ................... 248/410, 354 L, 355; 292/306; 144/193 A, 193 R

[56] References Cited

U.S. PATENT DOCUMENTS

| | | | |
|---|---|---|---|
| 1,716,904 | 6/1929 | Siderits | 248/354 X |
| 1,844,760 | 2/1932 | Haynes | 248/355 |
| 4,116,251 | 9/1978 | Graney | 144/193 R |

FOREIGN PATENT DOCUMENTS

722819  2/1955  United Kingdom ............ 248/354 L

*Primary Examiner*—W. D. Bray
*Attorney, Agent, or Firm*—E. Thorpe Barrett

[57] ABSTRACT

An improved log splitter for home use incorporating a load-responsive clamping mechanism of the type that utilizes a stack of locking plates surrounding a cylindrical member to which the plates are to be clamped by a tilting action. The plates are prevented from chewing up the surface of the cylindrical member by a pair of shoes positioned on opposite sides of the cylindrical member and within the openings in the locking plates. One of the shoes is smooth and adapted to move longitudinally on the cylindrical member during the application of clamping force and the other is rough and remains stationary during the clamping action.

19 Claims, 18 Drawing Figures

LOG SPLITTER WITH IMPROVED CLAMP

This application is a continuation-in-part of my application entitled LOG SPLITTER, filed Jan. 27, 1978, Ser. No. 873,060 now abandoned.

Reference is made to my application entitled LOG SPLITTER WITH OVERLOAD PROTECTION filed of even date herewith.

This invention relates to a log splitter incorporating a hand-operated clamping mechanism capable of withstanding the large forces generated by the splitting action and which is yet light in weight and easily operated. The application of the clamping mechanism is not limited to log splitters but may be applied in diverse applications where releasable clamps must withstand large forces.

The leverage action obtained when the central opening of a stiff plate is placed over a pipe and the plate is tilted so that the opposite edges of the opening bite into the pipe is well known, the amount of leverage depending upon the thickness of the plate and the clearance between the opening in the plate and the pipe. In such a clamp, the clamping force is produced by the applied load so that the greater the load the greater the clamping force.

Load-responsive clamps taking advantage of such leverage are satisfactory for many applications where the loads are not excessive. However, a log splitter to be practical, even for home use, must develop a splitting force of ten or more tons. Plate clamps can be constructed to withstand such forces by incorporating a series of hardened steel locking plates that bite into the surface of the pipe or other support which they surround to gain the necessary anchorage. However, as the biting action takes place, the edge of the plate that is moving into the pipe support is at the same time moving incrementally along the pipe causing a chewing of the pipe surface. After some period of the use of such a clamp in a log splitter, the surface of the pipe support will become so chewed up and ragged that it is difficult or even impossible to move the clamp along it even when in the released position.

It is accordingly an object of this invention to provide a log-splitter that is low in cost and light enough in construction to make it practical for home use. The invention includes an improved clamping mechanism that is capable of withstanding the large forces generated during the splitting operation yet does not deform or destroy the guide member to which the clamping forces are applied.

A preferred embodiment of the invention utilizes a stack of locking plates surrounding a cylindrical guide member and arranged to be tilted to provide a locking action against the guide member. A gripper shoe is positioned between one side of the guide member and the locking plates and a smooth slipper shoe is similarly positioned on the other side of the guide member so that longitudinal movement of the adjacent side of the plates along the guide member during the application of the clamping force will not damage the surface.

It is thus a further object of this invention to provide a load-responsive clamp, for any application, wherein protective shoes are positioned between the clamping elements and the member on which the clamping force is to be exerted so as to prevent damage to the surface of that member.

These and other objects will be in part pointed out in and in part apparent from the following description of a preferred embodiment of the invention considered in conjunction with the accompanying drawings, in which:

Figures 1, 17:
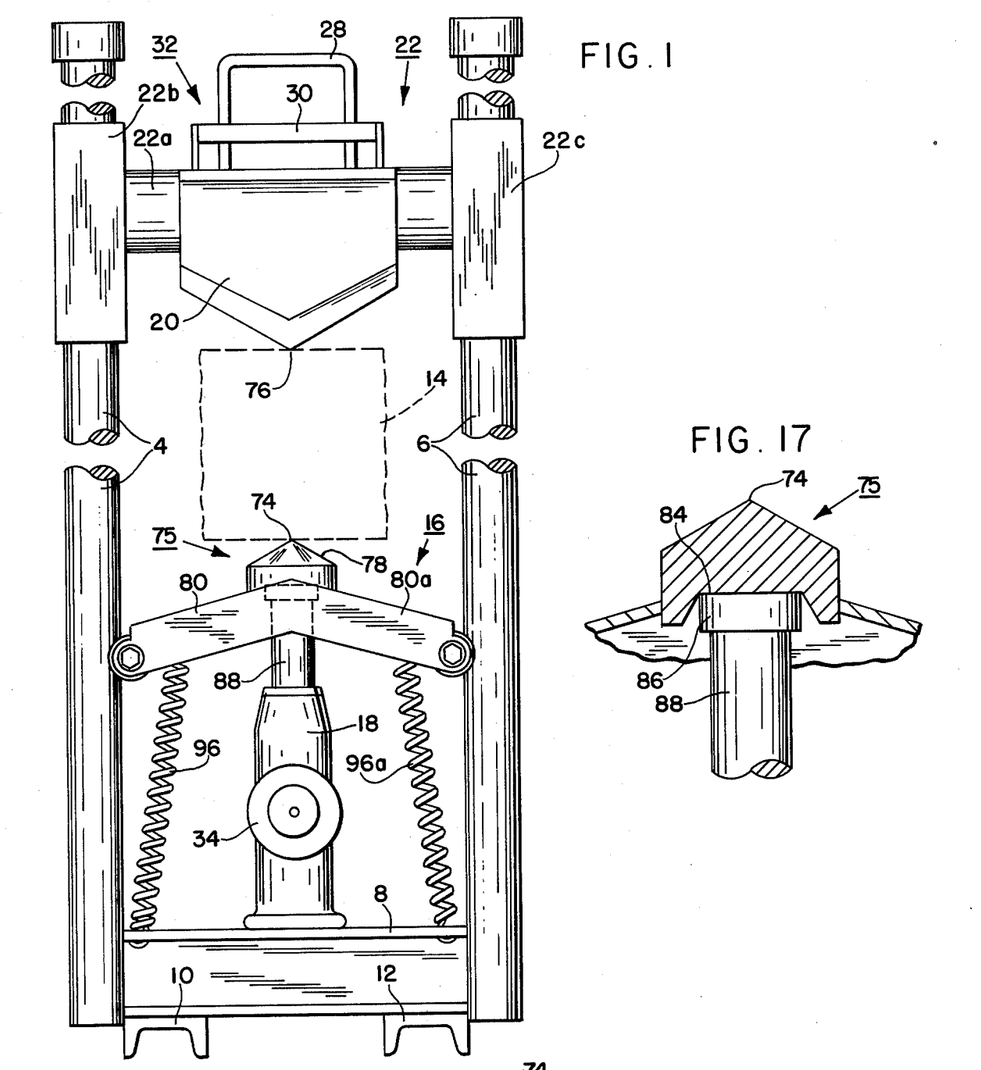
FIG. 1 is a front view of a log splitter embodying the invention.
FIG. 17 is an enlarged partial sectional view showing the junction of the jack plunger head and the log-supporting cone member.

As shown in FIG. 1, the log splitter includes a pair of spaced parallel upright guide members 4 and 6, which may be formed of steel pipe or other material having the requisite strength, that are supported by a base 8 formed of a steel I-beam that extends between and is welded at either end to the members 4 and 6. The base 8 is in turn supported by a pair of spaced parallel lengths 10 and 12 of channel iron that are welded to and extend perpendicularly from the base 8.

To support the lower end of a log to be split, indicated in outline at 14, a support and moment-limiting mechanism, generally indicated at 16, extends between the guide members 4 and 6 and rests on top of a hydraulic jack, generally indicated at 18, which may be a conventional automobile jack, modified as described later to provide overload protection at a predetermined force to prevent damage from continued jack operation.

Figure 13:
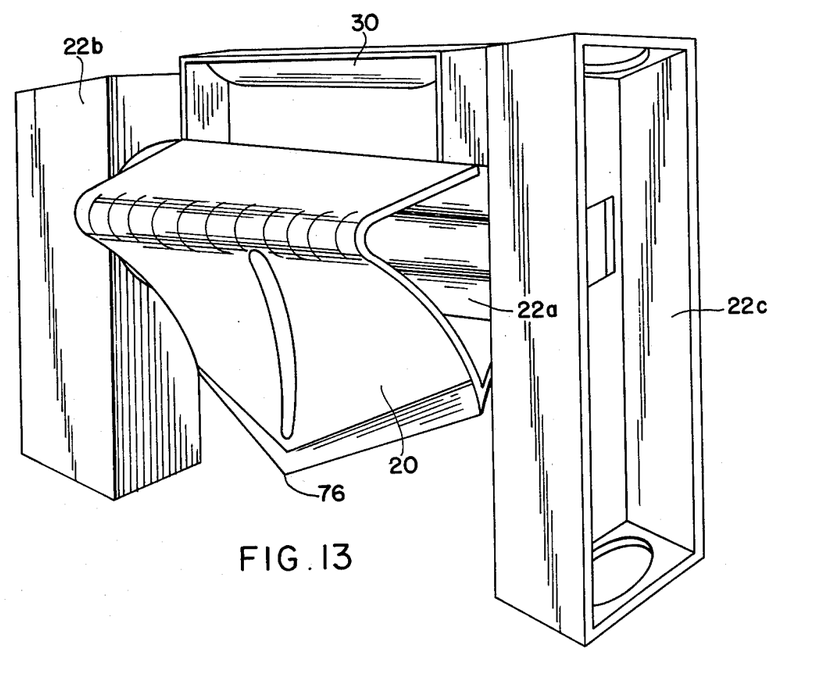
FIG. 13 is a perspective view of the carriage assembly.

A carriage assembly, generally indicated at 22, which extends between and is slidably mounted on the guide members 4 and 6, includes a carriage member 22a of circular cross section, a downwardly depending splitting wedge 20 and two brackets 22b and 22c that respectively house two quick-release clamping assemblies, generally indicated at 24 and 26. These components are securely welded together to form the carriage assembly as illustrated in FIG. 13.

In operation, the carriage assembly 22 is released from the guide members 4 and 6 by grasping a movable handle 28 and a fixed handle 30 of a hand-operated clamp actuator, generally indicated at 32, and squeezing to move the handle 28 toward the fixed handle 30. By means of the same two handles, the carriage assembly 22 can be lifted upwardly to a position that will allow the log 14 to be placed on the support 16. The pressure on the actuator 32 is then released allowing the clamps 24 and 26 to reengage the guide members 4 and 6 and hold the carriage assembly in that position. The operator then places the log on the support 16 and holds it in position with one hand while with the other he releases the clamps 24 and 26 by squeezing the actuator 32 and lowers the carriage assembly 22 until the wedge 20 is in firm engagement with the log. The actuator 32 is then released and the clamps 24 and 26 engage the guide members 4 and 6 to prevent upward movement of the carriage assembly 22.

The jack 18 is then actuated by either foot motion or an electric motor, as indicated at 34, to force the support 16 and the log 14 upwardly so that the wedge 20 penetrates and splits the log. It is important that the clamping mechanism be continuously adjustable so that it can be clamped at any position along the guide members in order that the wedge can hold the log in position when the actuator 32 is released.

A practical log splitter must be capable of exerting large forces on the log, of the order of 10 or 12 tons, and this requirement places stringent demands on the construction of the splitter. To provide a structure capable of withstanding the necessary forces without damage, a very large and heavy structure must be provided or care must be taken both to minimize and limit the twisting moments that the frame must carry. In addition, the clamps 24 and 26 must be able to resist this large splitting force without giving way, yet must be light enough to be lifted, along with the carriage assembly 22, with one arm. For practical use the clamp release actuator must be one that can be operated with one hand while the other hand holds or balances the log in position. An operable clamp can be formed by a series of locking plates arranged to be inclined so that the opposite edges of a central opening through each plate engage opposite sides of a guide member extending through the opening. With this arrangement, as force is applied to clamp by the splitting action, the gripping force exerted on the guide members increases, providing an effective bar to movement of the clamp. Such a clamp having a locking force responsive to the applied pressure, that is, the greater the force required to split the log the greater the clamping force, can be both light in weight and easily operated. However, because the forces that must be contained are large, the locking plates must be formed of hardened steel and the slight longitudinal movement of each plate that occurs as it pivots and bites into the guide member produces a cutting or digging action that with continued use so chews up the surface of the guide member that the clamp will, when released, not move freely along the guide member.

Figure 8:
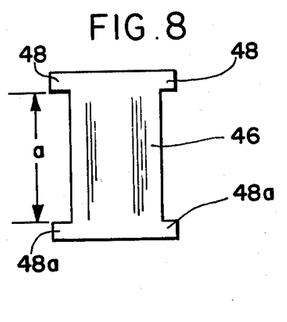
FIG. 8 is a front view of a slipper shoe used in the clamp assembly.
Figure 9:
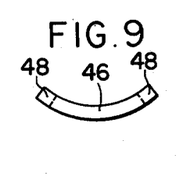
FIG. 9 is a top view of the slipper shoe shown in FIG. 8.

These difficulties are overcome by the use of the clamps 24 and 26, which are identical except for being mirror images. The clamp 24 is shown in detail in FIGS. 2 through 12 as representative of the construction of both clamps. The guide member 4 is surrounded by a stack of ten locking plates 36 each having a central opening as shown in FIG. 4. The bottom plate 38 in the stack is identical with the other ten plates except that it has formed integrally with it an operating arm 40 (See also FIG. 5) that tilts the plates to release the clamping action. Each of the plates 36 and 38 is provided with oppositely-disposed notches 42 and 44 that form vertical arcuate channels between the plates and the opposite surfaces of the guide member. Positioned within the channel on the side adjacent the arm 40 is a smooth metal slipper shoe 46 (FIGS. 3, 8 and 9) which is curved to fit nicely against the surface of the guide member 4. The central width of the shoe 46 is such that it substantially fills the notches 44 in the locking plates and at each end the shoe is provided with a pair of outwardly-extending, oppositely-disposed ears 48 and 48a by which the shoe is maintained in the desired relationship with the locking plates, that is, once the shoe 46 is positioned within the notches 44 and the assembly is placed over the guide member 4, the slipper shoe 46 is held in position between the plates and the guide member. To allow room for the plates when they are inclined as in FIG. 2, the distance between the two sets of ears, indicated at "a" in FIG. 8, is slightly greater than the combined thicknesses of all of the plates 36 and 38.

A metal gripper shoe 50 is positioned within the channel 42 between the plates and the guide member on the opposite side of the guide member 4. This gripper shoe 50 has the same general shape as the slipper shoe 46, but is provided on its inner surface with a series of crosswise knurls 52 and on its outer surface with a series of steps, generally indicated at 54, each of which has an inclined seating surface 56 (FIG. 12) equal in height to the thickness of one of the locking plates 36. The angle of the seating surface 56 is such that when the locking plates 36 and 38 are tilted so that the clamp is in its locked position, the inner surface of each locking plate abuts in flush relationship one of the inclined seating surfaces 56. The inner knurled surface of the shoe 50 grips the guide member 4 and the outer steps 54 provide a series of seats for the locking plates 36 and 38. The steps also serve to secure the locking plates in position when the plates are tilted so the clamp is in its locked position.

Figure 5:
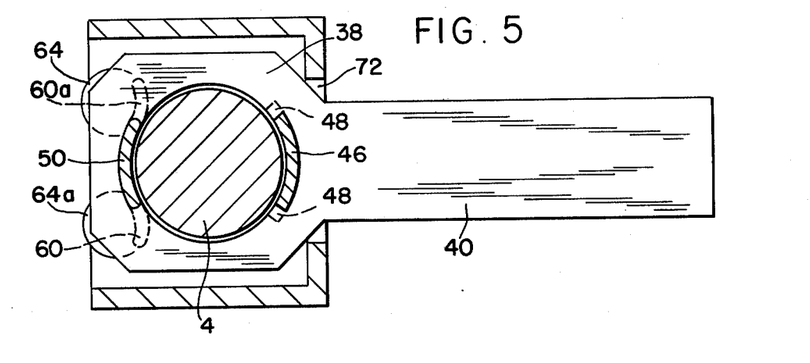
FIG. 5 is a sectional view taken along line 5—5 of FIG. 3.
Figure 6:
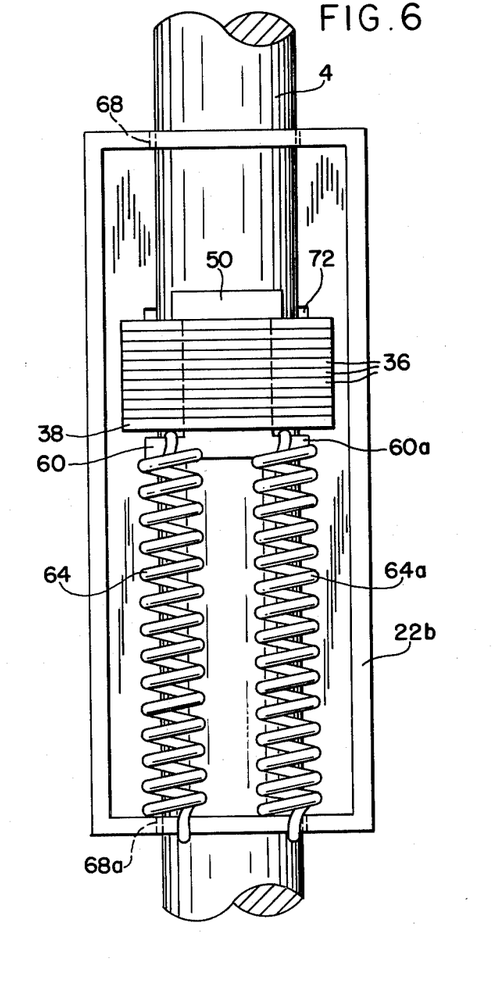
FIG. 6 is a side view taken along line 6—6 of FIG. 3.
Figure 7:
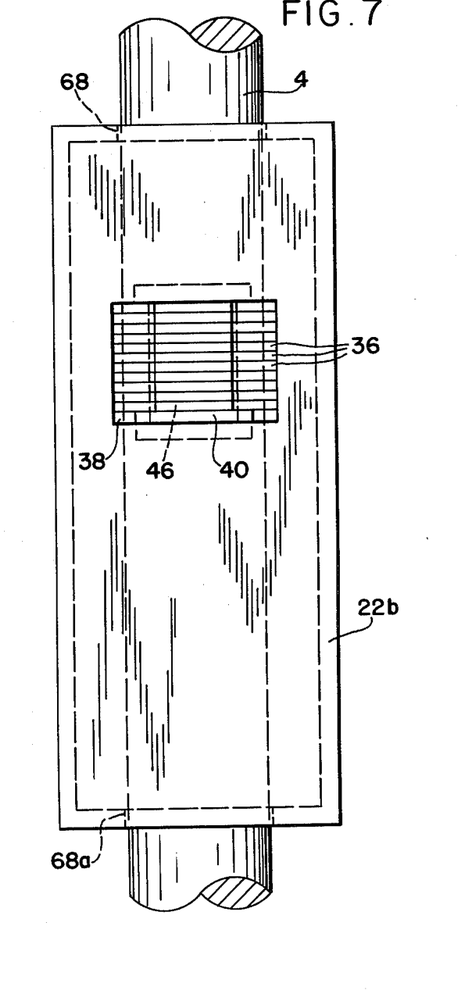
FIG. 7 is a side view taken along line 7—7 of FIG. 3.
Figure 10:
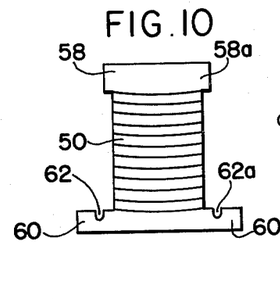
FIG. 10 is a front view of a gripper shoe used in the clamp assembly.
Figure 11:
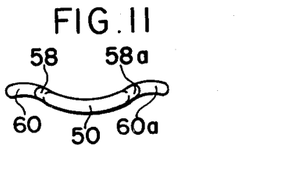
FIG. 11 is a top view of the gripper shoe shown in FIG. 10.

The upper end of the gripper shoe 50 is provided with a pair of oppositely-disposed ears 58 and 58a (FIGS. 5, 10, and 11) that impinge on the topmost locking plate 36 and prevent the shoe 50 from sliding downwardly out of the assembly. Two ears 60 and 60a, which extend outwardly from the lower end of the gripper shoe 50, are longer than the ears 58 and 58a and instead of following the curvature of the guide member 4, as do the ears 58 and 58a, are bent outwardly away from the surface of the guide member 4, as best shown in FIG. 5, to provide room for two coil springs 64 and 64a which are hooked into notches 62 and 62a and connected at their opposite ends to the bracket 22b.

The entire clamping assembly is housed in the bracket 22b which forms a box-like covering with two circular openings 68 and 68a at the top and bottom, respectively, through which the guide member 4 passes.

The wall 70 of the bracket 22b nearest the wedge 20 is spaced from the guide member 4 by a distance slightly greater than the thickness of the slipper shoe 46 so that the locking plates 36 and 38 extend into a rectangular opening 72 in the wall 70. The lower locking plate 38 which is formed integrally with the arm 40 rests on the lower surface 71 of this opening 72. The outer wall of the brcket 22b is omitted so that the bracket 22b in effect forms a five-sided box that can be moved along the guide member 4.

The bracket 22b is firmly welded to the carriage 22a that carries the wedge 20 and to the other similar bracket 22c of the clamp 26. The construction of this one-piece sub-assembly is best seen in FIG. 13.

Figure 2:
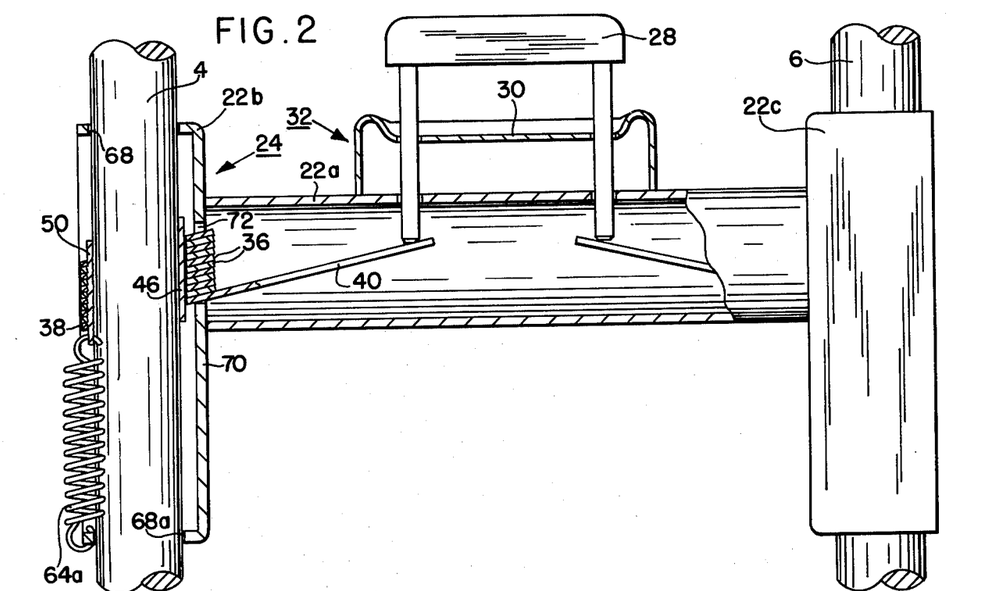
FIG. 2 is an enlarged partial sectional view showing the clamping and actuating mechanism for positioning and clamping the splitting wedge.
Figures 3, 4:
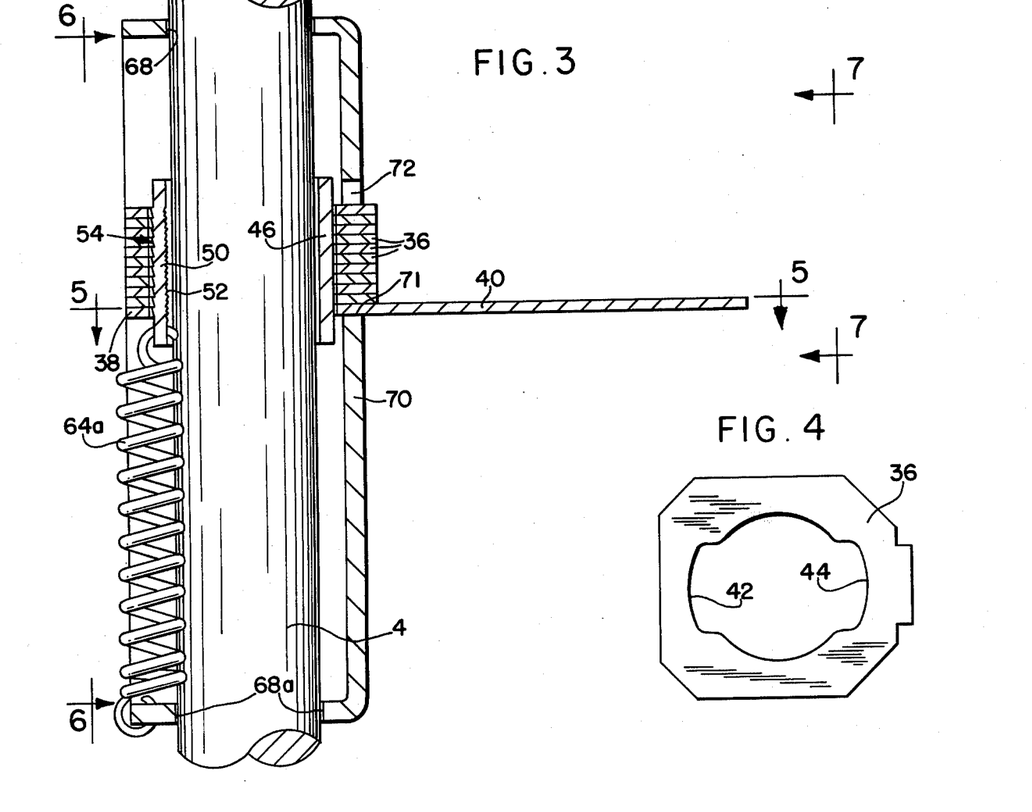
FIG. 3 is a partial sectional view of the clamping assembly in released position.
FIG. 4 is a top view of one of the locking plates used in the clamping assembly.

FIG. 2 shows the position of the locking plates 36 and 38 and the arm 40 when the clamp is in its locked position. Since the wedge 20 and the carriage 22a are formed integrally with the bracket 22b, the splitting force that is developed as the log 14 is pushed upwardly into the wedge 20 is transmitted to the bracket 22b. As this upward force is applied to the bracket 22b, the surface 71 transmits this force to one side of the locking plates 36 and 38 causing the slipper shoe 46 and the gripper shoe 50 to be clamped into engagement with the guide member 4 locking the clamp 24 firmly in position. As the splitting force increases, the clamping force increases correspondingly so that in spite of the relatively light weight of the clamp it is able to withstand the very large forces generated in the splitting operation.

It will be noted that when the upward force is applied to the bracket 22b, the slipper shoe 46, which has a smooth inner surface, slides upwardly as the locking plates 36 and 38 are tilted. These plates rotate about the points where they make contact with the surface of the gripper shoe 50 so there is no vertical movement of the gripper shoe 50 relative to the guide member 4. This direct clamping by the application of forces to the shoe 50 in a direction perpendicular to the axis of the guide member 4 eliminates the chewing action that would occur if the gripper shoe moved vertically, even incrementally, with the application of clamping force.

The forces developed during the clamping action are very large and the components of the clamp must be selected to withstand these forces. The shoes 46 and 50 are subject to extremely high pressures and are best formed of heat-treated hardened steel. The tensile forces exerted on the locking plates are also very high and these, also, should be formed of high strength heat-treated steel. The use of a number of separate locking plates provides high tensile strength while permitting enough elasticity that each locking plate carries an equal load. It will be noted that the parts of each locking plate between the section engaging the gripper shoe and that engaging the slipper shoe serve only as connecting members under tension. Thus, it is not necessary that each locking plate be an integral piece: it could be formed of two engaging parts connected by tension links formed, as one example, from one or more links of chain. Thus, the guide member 4 need not be circular in cross section: an I-beam or any other cylindrical shape could be used as a guide member with a corresponding change in the structure of the locking plates.

Moreover, because of the high forces that are produced, it is important that all parts fit nicely together so that fracturing of the parts is prevented. The curvature of the shoes should correspond as closely as possible to the curvature of the outer surface of the guide member 4 and to the inner surfaces of the locking plates.

Figure 12:
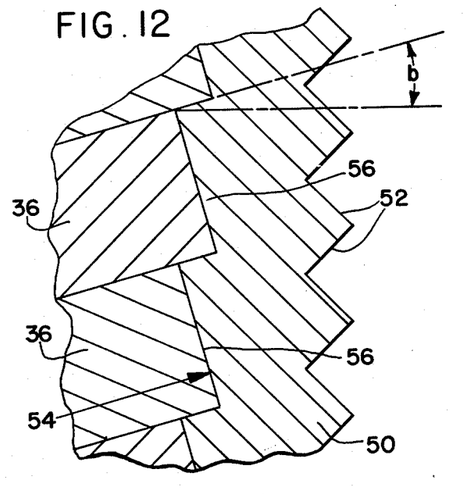
FIG. 12 is an enlarged partial section showing the relationship of inclined steps formed on the gripper shoe surface to the locking plates.

The angle of each seating surface 56, shown at "b" in FIG. 12, should correspond exactly with the angle of tilt of the locking plates 36 and 38 when the clamp is in fully locked position. In this way, the inner surface of each locking plate is in firm and full contact with one of the seating surfaces 56 throughout the width of the gripper shoe 50.

The magnitude of the angle "b" will depend upon the total clearances between the guide member 4 and the inner surfaces of the shoes 46 and 50 and between the outer surfaces of the shoes 46 and 50 and the inner surfaces of the locking plates 36 and 38. These clearances and therefore the magnitude of the angle "b" will be adjusted in accordance with the clamping pressure to be developed for a particular application. In a log splitter such as the one described here, an angle between 10 and 15 degrees is suitable.

During the time upward force is being applied to the bracket 22b, the clamp cannot be released by actuating the arm 40, but when the force is removed, the arm 40 can be moved downwardly by downward movement of the handle 28 relative to the carriage assembly 22 rotating the locking plates 36 and 38 about the fulcrum provided by the surface 71 and sliding the gripper shoe upwardly against the force of the tension springs 64 and 64a which are connected between the shoe 50 and the bracket 22b. The locking plates and shoes are thus moved to the release position shown in FIG. 3 and the carriage assembly 20 is free to move vertically along the guide member 4.

When the handle 28 is released, the tension springs 64 and 64a cause the gripper shoe 50 to move downwardly rotating the locking plates about the surface 71 until the gripper shoe 50 makes light engagement with the surface of the guide member 4. During this motion the rotation of the locking plates has been about the surface 71 and the gripper shoe 50 has moved along the surface of the guide member 4. This motion is only sufficient to bring the locking plates into light clamping position sufficient to place the gripper shoe in position that when any upward force is applied to the bracket 22b, the gripper will be clamped inwardly against the guide member 4, that is, when upward force is applied to the carriage assembly 22, either by the splitting operation or merely by the weight of the carriage assembly, the point of rotation shifts from the surface 71 to the surface of the gripper shoe 50 and no further vertical movement of the gripper shoe occurs.

In this example, because of the extremely high forces that are produced, the gripper shoe 50 is formed of hardened steel and its inner surface is roughened by means of a series of serrations. With such construction there is a slight indentation of the surface of the guide member 4 that enables the clamp to withstand the extreme loads. Such physical indentation is not always necessary, it being required only that the gripper shoe provide sufficient friction with respect to the surface of the guide member to withstand the forces of the particular application. Thus, for some applications, resilient material such as a piece of brake lining can be made to serve as a gripper shoe, the rough surface of the lining providing sufficient friction for use in many applications. By rough surface is meant an uneven surface that provides sufficient friction under the conditions of use to hold the clamp in the desired position when the load is applied.

It is also possible under certain conditions to eliminate the gripper shoe while depending upon the slipper shoe to prevent chewing of the guide member. For example, the side of the guide member opposite the slipper shoe can be provided throughout its operating length with a series of inclined steps each adapted to receive one of the locking plates in the same manner as does the outside surface of the gripper shoe. For most applications, such an arrangement is more expensive and less satisfactory than the use of a gripper shoe.

In addition to providing the necessary clamping force to contain the vertical thrust produced by the splitting action, it is necessary also to prevent so far as possible the generation of twisting moments. If such twisting moments are not controlled they will distort the guide members or other parts of the frame. If the frame and guide members are merely made of stronger and heavier material to prevent such deformation, the splitter becomes large and unwieldly with a corresponding increase in manufacturing cost thus defeating the objective of a lightweight low-cost log splitter suitable for home use.

Moreover, although the clamping mechanism described here is capable of withstanding the forces necessary for splitting logs, there is a point of failure and the generation of excessive moments reduces the load on one of the two clamps at the expense of the other and failure of the more heavily loaded clamp may occur. The maintenance of symmetrical forces will minimize the likelihood of such failures.

In order to minimize the generation of twisting moments, the splitting forces are applied to the log at vertically aligned points so that the guide members 4 and 6 are subjected only to tensile forces and need not be constructed to resist large twisting moments. In practice, steel pipe two inches in outside diameter has been found to be adequate with the construction described here, but would be wholly inadequate were the twisting moments uncontrolled.

Figure 14:
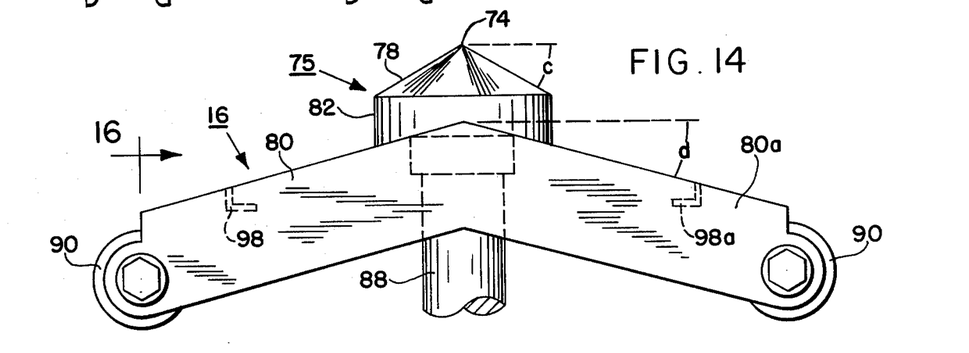
FIG. 14 is a side view of the log support member.

To apply the vertically aligned forces, the bottom end of the log 14 is positioned on on the uppermost point 74 of a projecting cone member, generally indicated at 75, mounted on the support 16, which point is directly below and in vertical alignment with the bottom tip 76 of the wedge 20. The point 74 is formed at the end of a conical surface 78 which extends to a base of about 3 to $3\frac{1}{2}$ inches in diameter. The point 74 is not intended to make substantial penetration of the log during the splitting action and the angle of the conical surface, indicated at "c" in FIG. 14 is blunt enough, approximately 30 degrees, that penetration is limited even under adverse conditions. If there were no penetration and the log were a perfectly homogeneous structure, no twisting moments would be developed, but such conditions do not exist under practical operating conditions. Therefore, it is necessary to provide for a finite surface area to support the bottom end of the log, but that area should be the minimum necessary to provide the required support for the log. For example, if the log were supported on a flat base large enough to encompass the entire width of the log, large twisting moments could be developed, particularly if the bottom end of the log were cut at an angle much different from the perpendicular to the axis of the log, and such twisting moments could be sufficient to destroy a frame composed of guide members such as are described here. If the area is made too small, the projection will merely penetrate the log and permit the end of the log to make contact with the base support at points farther removed from the center. A central projection having a flat surface with between one and eight square inches of area has been found to be satisfactory. It is, however desirable to provide some means for making some penetration of the log in order to anchor it in position during the splitting operation. This has been done by providing small spikes or other sharp projection extending upwardly from a flat base. When the spike or projection has fully penetrated the log, the log rests on the flat base and the undesired twisting moments are developed. The present structure provides means for anchoring the log in position and at the same time preventing the development of excessive twisting moments.

As shown in FIG. 14, the support 16 includes two generally U-shaped channel members 80 and 80a which are welded together to form a rigid structure with top surfaces that slope downwardly from the central point of the juncture. The angle formed between the upper surfaces of the members 80 and 80a from the horizontal, indicated at "d" in FIG. 14, may be somewhat less than the angle "c" and preferably is between 15 and 40 degrees. The angle "c" preferably is between 20 and 40 degrees, which for most applications provides sufficient anchoring of the log while resisting excessive penetration that would increase the twisting moments developed. The diameter of the cone member 75 is preferably not less than $1\frac{1}{8}$ inches and a diameter of $3\frac{1}{4}$ inches has been found to be a completely satisfactory dimension with an angle "c" of 30 degrees.

The cone member 75 includes a vertical wall portion 82 which is welded around its lower edge to the U-shaped members 80 and 80a so that the conical surface 78 is elevated above the uppermost point of the juncture of the members 80 and 80a. The cone member 75 has a solid metal core within the conical portion that is provided with an internal recess adapted to receive the head 86 of the actuating plunger 88 of the jack 18.

Figure 15:
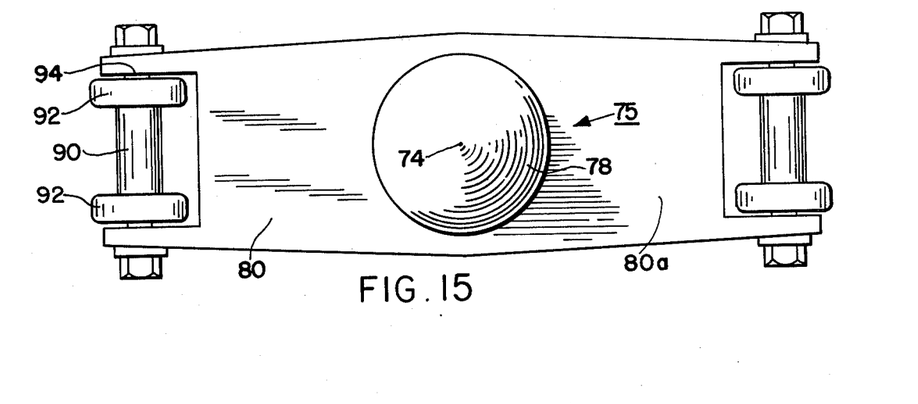
FIG. 15 is a top view of the log support member shown in FIG. 14.
Figure 16:
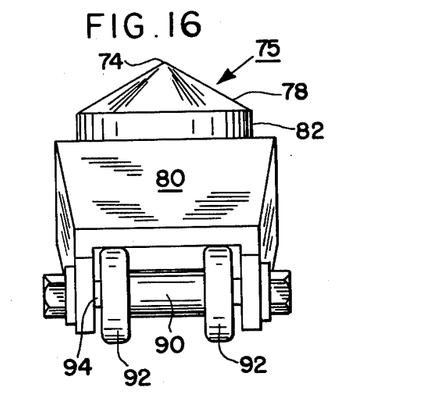
FIG. 16 is an end view of the log support member taken along line 16 of FIG. 14.

The outer end of each member 80 and 80a carries a roller 90 having a pair of flange wheels 92 (FIG. 16) which is mounted for rotation on a bearing shaft 94. The flange wheels 92 are arranged to straddle a portion of the circumference of the guide members 4 and 6, as indicated by the broken lines in FIG. 15. Thus, as the plunger 88 moves the support member upwardly, the rollers 90 and 92 are guided by but are not secured to the guide members 4 and 6.

The support member 16 is not secured to the head 86, but is maintained in firm engagement therewith by two coil tension springs 96 and 96a secured at their lower ends to the base 8 and at their upper ends to the U-shaped members 80 and 80a by means of ears 98 and 98a.

Although the construction of the splitter minimizes the generation of twisting moments, they cannot be eliminated. Such twisting moments can result from uneven density of the log, such as is caused by knots and uneven grain structure, grain that runs at an angle to the direction of travel of the log during splitting, logs that are cut unevenly or at angles other than perpendicular to the axis of the log, or by improper positioning of the log in the log splitter. Because the development of an extreme twisting moment would otherwise destroy the splitter, the support 16 is arranged to provide a fail-safe function that prevents the transmission of excessive twisting moments or lateral forces to the guide members 4 and 6.

Figure 18:
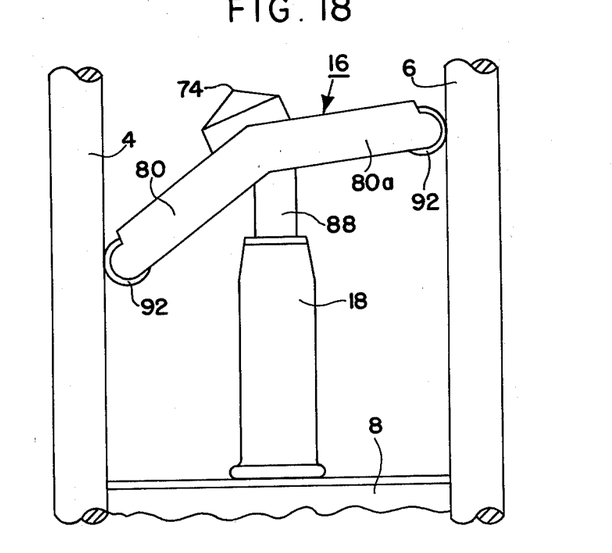
FIG. 18 is a diagrammatic representation of the fail-safe mechanism when the log splitter is subjected to an excessive twisting moment.

The head 86 is in direct alignment with the point 74 of the cone member 75 and the tip 76 of the splitting wedge 20 so that under the usual conditions of operation, the support member 16 forms a rigid structure with the plunger 88. However, should an excessive twisting moment develop during the splitting operation, the forces will be transmitted to the support member 16. When the value of this moment reaches a critical value, the cone member 75 and the support 16 will tilt on the head 86 terminating the rigidity of the structure and allowing the support member 16 to tilt as shown in FIG.

18. When the angle of tilt becomes large enough, the rollers 90 separate from the guide members 4 and 6 and the support member 16 topples off the plunger 88 and the log is released. The support member 16 can be immediately remounted on the head 18 and the splitting operation resumed, for the structure of the log splitter remains undamaged.

Other devices can be used to limit the transverse forces or twisting moments such as load switches or strain gauges arranged to interrupt the supply of electrical current to the motor 34. However, such devices are generally more expensive and troublesome in use than the simple mechanical arrangement described here.

Clearly, some tolerance for twisting moments must be provided and the force that can be tolerated depends upon the dimensions associated with the support 16. Note that the guide members 4 and 6 merely serve as a track for the rollers 90 and that if collars that encircle the guide members were to be substituted for the rollers, the entire structure would bind and be deformed by the twisting moments.

From the foregoing it will be seen that the log splitter described above is well suited for its intended use and that the operation is facilitated in no small degree by the clamping mechanism embodying the invention, it being apparent that although the invention is described as embodied in a log splitter, it has many other and unrelated uses and that the structure can be modified readily to best suit it to each particular use.

What is claimed is:

1. A log splitter comprising first and second guide members, means supporting said guide members in spaced parallel relationship, a support positioned between said guide members for supporting a log to be split, a carriage extending between said guide members, a splitting wedge carried by said carriage, clamping means secured to said carriage and arranged to releasably clamp said carriage to said first guide member including a locking member surrounding and movable along said first guide member, an operating arm extending from said locking member and arranged to tilt said locking member with respect to the longitudinal axis of said first guide member, a gripper shoe positioned between said locking member and said first guide member, and a slipper shoe positioned on the side of said first guide member opposite said gripper shoe between said first guide member and said locking member, and drive means for moving said support into closing relationship with said wedge.

2. A log splitter as claimed in claim 1 wherein said clamping means includes a plurality of locking members in surface-to-surface contact.

3. A log splitter as claimed in claim 1 including a second clamping means coupled to said carriage and arranged to releasably clamp said carriage to said second guide member.

4. A log splitter as claimed in claim 3 including a common actuator coupled to said first and second clamping means and adapted for one-hand operation to simultaneously release both of said clamping means.

5. A log splitter as claimed in claim 4 wherein each of said guide members includes a cylindrical portion along which said clamping means are arranged to move and wherein said second clamping means is substantially the same as said first clamping means.

6. A log splitter comprising first and second cylindrical guide members, means supporting said guide members in spaced parallel relationship, a support extending between said guide members arranged to abut one end of a log to be split, a carriage extending between said guide members, a splitting wedge carried by said carriage, first and second clamping means secured to opposite ends of said carriage and arranged respectively to releasably clamp said carriage to said first and second guide members, each of said clamping means including a locking member surrounding one of said guide members, and a gripper shoe and a slipper shoe positioned on opposite sides of said guide member and between the said locking member and said guide member, common actuating means coupled to said locking member in said first clamping means and to said locking member in said second clamping means and arranged to release simultaneously said first and second clamping means, and drive means for moving said support into closing relationship with said carriage.

7. A log splitter as claimed in claim 6 wherein said gripper shoe is provided on one surface with a series of inclined steps each adapted to receive one of said locking members.

8. A log splitter as claimed in claim 7 wherein each of said clamping means includes a bracket surrounding one of said guide members and including a support for said operating arm, and tension spring means connected between said gripper shoe and said bracket.

9. A clamping mechanism for gripping a cylindrical support having a longitudinal axis comprising
a locking member arranged to surround and be movable along said support,
actuating means arranged to tilt said locking member with respect to the longitudinal axis of said support,
a gripper shoe on one side of said support between said locking member and said support positioned to be engaged by said locking member and comprising a first plate having an inner surface conforming with the adjacent surface of said support, and
a slipper shoe between said locking member and said support on the side thereof opposite from said gripper shoe positioned to be engaged by said locking member and comprising a second plate having an inner surface conforming with the adjacent surface of said support,
whereby said actuating means causes said locking member to tilt and thereby force said gripper shoe and said slipper shoe into clamping engagement with said support.

10. A clamping mechanism as claimed in claim 9 wherein said slipper shoe has a smooth inner surface and said gripper shoe has a rough inner surface.

11. A clamping mechanism as claimed in claim 9 including a bracket surrounding said support and adapted to receive an external load and having a supporting surface arranged to engage and provide a fulcrum for said actuating means.

12. A clamping mechanism as claimed in claim 11 including a plurality of said locking members arranged in stacking relationship and wherein said actuator means is arranged to tilt simultaneously each of said locking members.

13. A clamping mechanism as claimed in claim 12 including tension springs means connected between said gripper shoe and said bracket.

14. A locking mechanism as claimed in claim 13 wherein said gripper shoe has a rough surface on the side adjacent said support.

15. A locking mechanism as claimed in claim 14 wherein the surface of said slipper shoe adjacent said support is smooth.

16. A locking mechanism as claimed in claim 14 wherein the surface of said gripper shoe adjacent said locking members comprises a plurality of inclined steps each adapted to receive one of said locking members.

17. A locking mechanism as claimed in claim 15 including retaining means arranged to capture said locking members within the spans of said gripper and slipper shoes.

18. A locking mechanism as claimed in claim 16 wherein said gripper shoe includes two oppositely-disposed ears and said spring means includes a pair of coil springs each connected between one of said ears and said bracket.

19. A locking mechanism as claimed in claim 17 in which each of said locking members is a plate having a central opening adapted to receive said support and first and second oppositely-disposed notches in said opening adapted to receive respectively said gripper shoe and said slipper shoe.

* * * * *